United States Patent
Kabel

[19]
[11] Patent Number: 5,930,200
[45] Date of Patent: Jul. 27, 1999

[54] DEPTH SOUNDER WITH OBJECT IDENTIFICATION FEATURE

[75] Inventor: Darrin W. Kabel, Overland Park, Kans.

[73] Assignee: Garmin Corporation, Taiwan

[21] Appl. No.: 09/075,416

[22] Filed: May 8, 1998

[51] Int. Cl.[6] .................................................. G01S 15/96
[52] U.S. Cl. ............................................. 367/107; 367/87
[58] Field of Search .............................. 367/87, 107, 108, 367/111, 113, 908

[56] References Cited

U.S. PATENT DOCUMENTS

| | | | |
|---|---|---|---|
| 4,081,783 | 3/1978 | Honda | 367/101 |
| 4,777,630 | 10/1988 | Burns | 367/87 |
| 4,829,492 | 5/1989 | Choi et al. | 367/110 |
| 4,943,951 | 7/1990 | Leavell et al. | 367/111 |
| 5,099,455 | 3/1992 | Parra | 367/120 |
| 5,184,330 | 2/1993 | Adams et al. | 367/111 |
| 5,327,398 | 7/1994 | Wansley et al. | 367/108 |

*Primary Examiner*—Ian J. Lobo
*Attorney, Agent, or Firm*—Shook, Hardy & Bacon LLP

[57] ABSTRACT

A sonar depth sounder device, and a method for processing echo signals reflected from objects within a body of water, utilize a processor, a memory, a display, and a keypad connected to the processor. A transmitter excites a transducer which emits sonar pulses into a body of water, and a receiver receives reflected sonar echo signals. Particularly, signals that have reflected from an object suspended in the water have an intensity, a history time duration, and a depth spreading characteristic. The processor compares one or more of the intensity, history time duration, and depth spreading characteristic of the reflected signals with corresponding sets of parameters stored in memory, which sets of parameters are representative of one or more selected objects, cross-talk noise, and unidentifiable noise. Upon interpretation of the reflected signals, the processor displays an icon, on the display, representative of the identified object, or rejects the signals as cross-talk noise and therefore does not display data indicative of the reflected signals, or upon the determination that the reflected signals are indicative of unidentifiable noise, processes data to prevent it from being displayed on the display.

17 Claims, 3 Drawing Sheets

DEPTH SOUNDER WITH OBJECT IDENTIFICATION FEATURE

BACKGROUND OF THE INVENTION

1. Field of the Invention

The present invention is generally directed to a depth sounder, such as employed in a fish finding apparatus. More particularly, the present invention is directed to a depth sounder and method for identifying both desired sonar targets and undesired echos.

2. Description of Related Art

The use of sonar echo sounding for recreational and commercial fish finding purposes is widespread. However, many find the presentation of "raw" echo sounder data to be difficult to interpret, and therefore favor devices which will translate received echos into pictures of fish or other icons which are easily recognized by the user. Conventional sounder devices having object identification features of this nature are extremely limited in their abilities, and are often "fooled" by noise of various types. Additionally, echo sounders are inherently subject to interference from other sounders operating in their vicinity. This interference causes vertical streaks to appear on the display of the sounder, causing clutter and difficulty in interpretation. Current fish finding technology utilizes closed feedback gain control loops to eliminate noise based upon the amount of energy being detected in a water column. This approach is effective in reducing interference from most noise sources and increases the confidence for fish detection. However, closed feedback gain control loops generate a fluctuation in the visual representation of an echo received from the bottom of the subject body of water, causing distortions destructive to interpretation of data indicative of other structure in the body of water.

Accordingly, the need exists for an effective and simple echo sounding solution for identifying objects in a body of water. The present invention fills these and other needs, while overcoming the drawbacks of prior devices.

SUMMARY OF THE INVENTION

A depth sounder of the present invention has a processor. An input, a display, and a memory are connected to the processor. The processor is connected to a transmitter/receiver, which is in turn connected to a transducer. In use, the transmitter transmits a plurality of signals, which are emitted from the transducer as sonar signals, towards the bottom surface of a body of water. The receiver receives sonar signals reflected back from the bottom surface of the body of water, and from any objects resting on the bottom surface of the body of water or suspended between the top surface of the body of water and the bottom surface of the body of water.

In accordance with an aspect of the present invention, a plurality of data parameters are stored in the memory of the sounder device. Echo data received by the receiver is processed by the processor and, particularly, is compared with the data parameters to determine the nature of the object from which the echo data was received. Particularly, stored in memory is at least a first set of data parameters indicative of a selected object, such as a fish, a second set of data parameters indicative of cross-talk noise, and a third set of data parameters indicative of unidentifiable noise.

When the processor receives raw echo data that has bounced off of an object in the body of water, the processor first determines whether the received data is indicative of cross-talk. In the event the data is indicative of cross-talk, the processor runs a cross-talk rejection algorithm to remove the data from processing and, particularly, for preventing the data from being displayed on the display of the sounder. When, however, the processor determines that the received echo data is not indicative of cross-talk, the processor then compares the received echo data with data parameters stored in memory that are indicative of an object "N", such as a fish. When the processor determines that the received echo data is indicative of a fish, the processor causes the display to display an icon indicative of the object "N", in this example, a fish. It will be understood that data parameters indicative of objects other than fish, as determined through testing, can be stored in memory. Accordingly, when the processor determines that the received echo data is not indicative of the object "N", it determines whether there are parameters stored in memory which are representative of additional objects and, if so, sequentially compares the received echo data with each of the stored parameter sets until the received echo data is determined to be indicative of a stored object "N", in which an icon (also stored in memory) for that object "N" is displayed, or until it is determined that the received echo data is not indicative of any of the objects stored in memory. When the processor indeed determines that the received echo data is not indicative of any stored objects, the processor compares the received echo data with stored parameters indicative of unidentifiable noise, to determine whether the received echo data is indicative of unidentifiable noise. When the processor determines that the data is indicative of unidentifiable noise, the processor processes the data to eliminate it, and particularly, does not display anything on the screen that is indicative of the unidentifiable noise. When, however, it is determined that the received echo data is not indicative of unidentifiable noise, the processor considers the data indicative of unidentifiable noise, and does not display any corresponding data on display. Processing then returns to a step for determining whether newly received data is indicative of cross-talk. As will be understood and appreciated, the received echo data is constantly updated as additional echo signals are received by the receiver.

More particularly, and in accordance with a further aspect of the present invention, data indicative of a selected minimum intensity level corresponding to cross-talk, as determined by testing, is stored in memory. Additionally, data indicative of a maximum time duration (e.g., history) corresponding to cross-talk is stored in memory. Further, data indicative of a minimum depth spreading value corresponding to cross-talk is also stored in memory. The processor of the sounder device, according to the principles of the invention, determines that the received echo data is indicative of cross-talk when the intensity of the received signal is greater than the selected minimum intensity level corresponding to cross-talk, and the time duration of the received signal is less than the selected maximum time value corresponding to cross-talk, and the depth spreading associated with the received signal is greater than the selected minimum depth spreading value.

When the processor determines that the received echo data is not indicative of cross-talk, the processor then determines whether the received data is indicative of a selected object. In this regard, data indicative of a minimum intensity for a selected object is stored in memory. Additionally, data indicative of a minimum time duration associated with the selected object is stored in memory. When the processor determines that the intensity of the received echo data is greater than the stored minimum intensity value and that the time duration associated with the received data is greater than the minimum time associated with the selected object, the processor causes the display to display an icon indicative of the selected object. In the event, however, that the processor determines that the received data is not indicative of the selected object, the processor determines if there are additional objects defined by parameters in memory and, if so, determines whether the received data is indicative of any of the objects. When the data is indicative of a selected object, an icon indicative of that object is displayed on the display. When, however, the received data is not indicative of any selected objects, the processor processes the data to determine whether the data is indicative of unidentifiable noise.

As part of the process to determine whether the received data is indicative of unidentifiable noise, the processor utilizes a value stored in memory that is representative of a maximum intensity associated with unidentifiable noise is stored in memory. Additionally, the value representative of a minimum time duration representative of unidentifiable noise is stored in memory. When the processor determines that the intensity of the received echo data is less than the selected maximum intensity value for unidentifiable noise and that the time duration associated with the received echo data is greater than the selected minimum time value associated with unidentifiable noise, the processor concludes that the received echo data is indicative of unidentifiable noise, and prevents that data from being displayed on the display. When, however, the processor determines that the received echo data is not indicative of unidentifiable noise, the processor, as a default measure, considers the received echo data to be unidentifiable noise and does not display any corresponding data on the display. Processing then returns to the step in which the processor determines whether received echo data is indicative of cross-talk.

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

Figure 1:
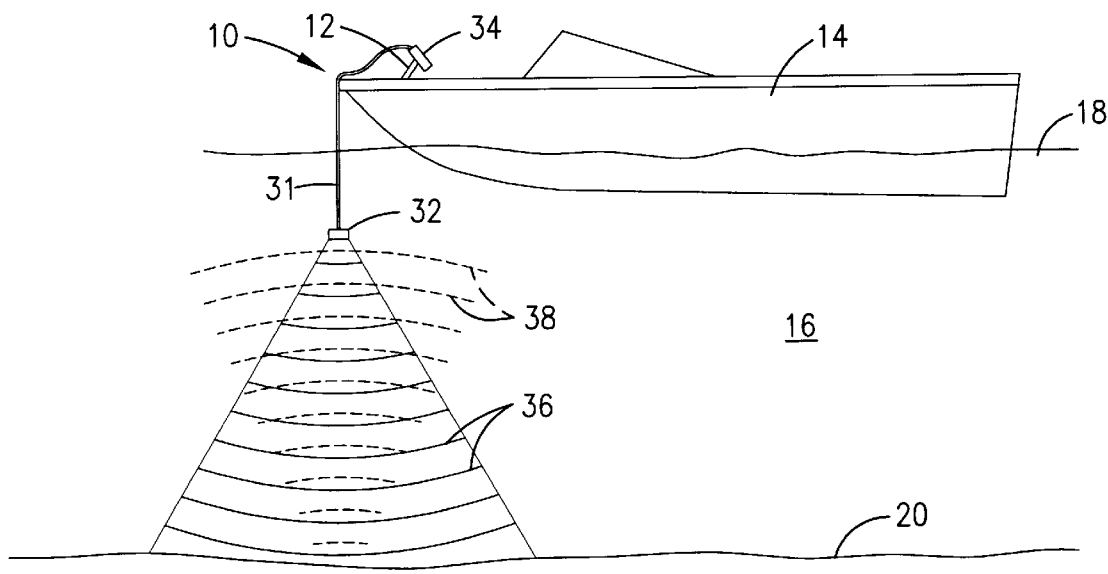
FIG. 1 is a side elevational view of a boat having a depth sounder of the present invention installed thereon.

With reference to the figures, and particularly FIG. 1, a sonar depth sounder of the present invention if designated generally by reference numeral 10. As illustrated, sonar depth sounder 10 is positioned by a mount 12 on the deck of a boat 14, which is floating in a body of water 16. The body of water 16 has a top surface 18 and a bottom surface 20.

Figure 2:
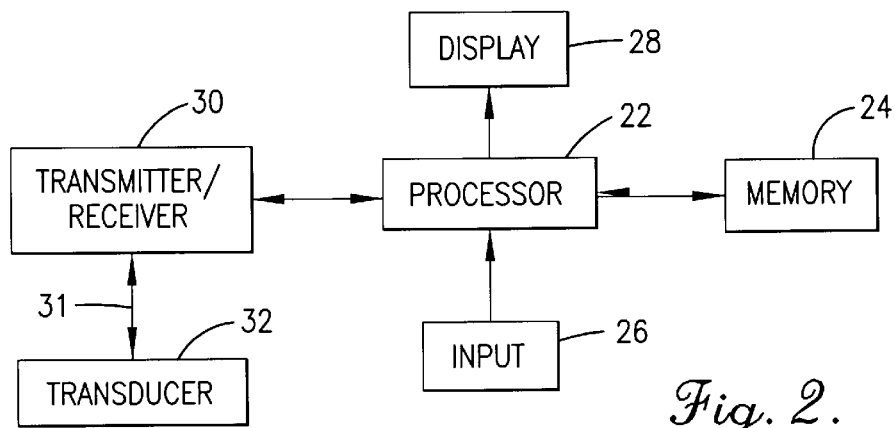
FIG. 2 is a block diagram of the components of the depth sounder of the present invention.

With additional reference to FIG. 2, sonar depth sounder 10 has a processor 22 and a memory 24, connected as shown. An input 26, such as a keypad, is connected to processor 22. Additionally, a display 28, for displaying a visual representation of bottom surface 20 of the body of water, and objects floating in a body of water or suspended between the top surface 18 and the bottom surface 20 of the body of water, is also connected to processor 22. A transmitter/receiver combination, designated by reference numeral 30, is also connected to processor 22. A transducer 32 is connected to transmitter receiver combination 30, as illustrated.

As illustrated in FIG. 1, the sonar depth sounder 10 of the present invention has a housing 34, connected to the mount 12. As will be understood, processor 22, memory 24, input 26, display 28, and transmitter/receiver 30 are housed within housing 34. Particularly, input 26 and display 28 are accessible at a face of housing 34 in a conventional fashion. Transducer 32 is suspended, from line 31, into the body of water 16.

During operation of sonar depth sounder 10, processor 22 controls the transmitter portion of transmitter receiver combination 30 to emit a plurality of output pulses. Those pulses cause transducer 32 to emit a series of sonar signals into the body of water 16. Particularly, transducer 32, when activated by the transmitter, sends out an ultrasonic pressure wave in an expanding pattern into the body of water 16. As will be readily appreciated by those skilled in the art, that expanding pattern defines what is often referred to, in simplified terms, as a cone of detection. FIG. 1 illustrates the expanding ultrasonic waves emitted from transducer 32 by reference numeral 36. The ultrasonic waves 36 bounce, or echo, off of the bottom surface 20, sending back expanding echo waves, designated generally by reference numeral 38. As will be readily understood, echos also reflect off, of objects suspended within the body of water 16, including particularly fish. As described in detail below, the receiver portion of transmitter receiver combination 30 receives the echo waves, and sends signals (e.g., data) representative of the received echo waves to processor 22 for processing.

Figure 3:
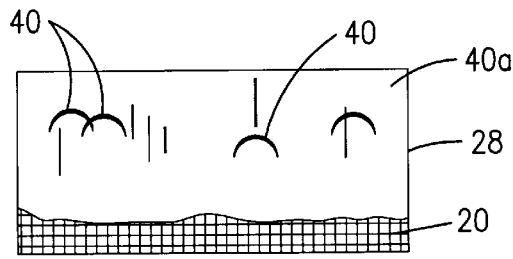
FIG. 3 is a graphical representation of how a typical fish object, typical cross-talk object, and a typical noisy fish would be represented on a display without the present invention.

With reference to FIG. 3, a graphical representation of an example of raw echo data received by the receiver is represented. Particularly, display 28, utilizing a conventional display technology, such as an LCD, displays a representation of bottom surface 20, and a number of typical fish objects 40. In particular, fish object 40a is considered a noisy fish, due to the presence of vertical line through the data indicative of the typical fish object. Additionally, cross-talk noise, referred to as a cross-talk object, is also illustrated on display 28.

It should be understood that the display illustrated in FIG. 3 is a typical visual representation of raw echo data, that has been received by the receiver, but not processed by processor 22 according to the principles of the present invention. Such a visual representation requires the operator of sonar depth sounder 10 to interpret the data, and determine that data which is useful, such as typical fish object, and that data which is unuseful, such as cross-talk or some other identifiable noise. Based upon determined typical characteristics of known objects, such as fish, cross-talk object (or cross-talk noise), and other unidentifiable noise, the present invention employs a process, carried out by software, for processing the raw echo data to display a visual representation that is more easily read by the user, without the requirement of significant mental interpretation by the operator of sonar depth sounder 10. It has been found that received echo signals have an intensity, a history time duration, and a depth spreading characteristic. The history time duration of an object, whether it be a desirable object or undesirable cross-talk object, or unidentifiable noise object, as represented by the received echo data, will have a history time duration. In this regard, as a transmitter outputs sequential pulse, and the responsive echo signal, indicative of a particular object is received, the period of time is lapsed from first received echo signal associated with an object to the last received echo signal associated with an object to define the history time duration associated with that object. Thus, for example, in the representation of FIG. 3, a typical fish object has a much greater history time duration than a typical cross-talk object or typical unidentifiable noise. Similarly, depth spreading values are typically different for fish, for example, than they are for noise objects. In this regard, depth spreading is measured in the vertical direction and, in the example of FIG. 3, the depth spreading (or vertical component) of a typical cross-talk object or typical unidentifiable noise object is greater than the depth spreading value associated with the typical fish object. Accordingly, the present invention utilizes parameters, determined by testing, indicative of the various objects, and stores these parameters in memory.

Figure 4:
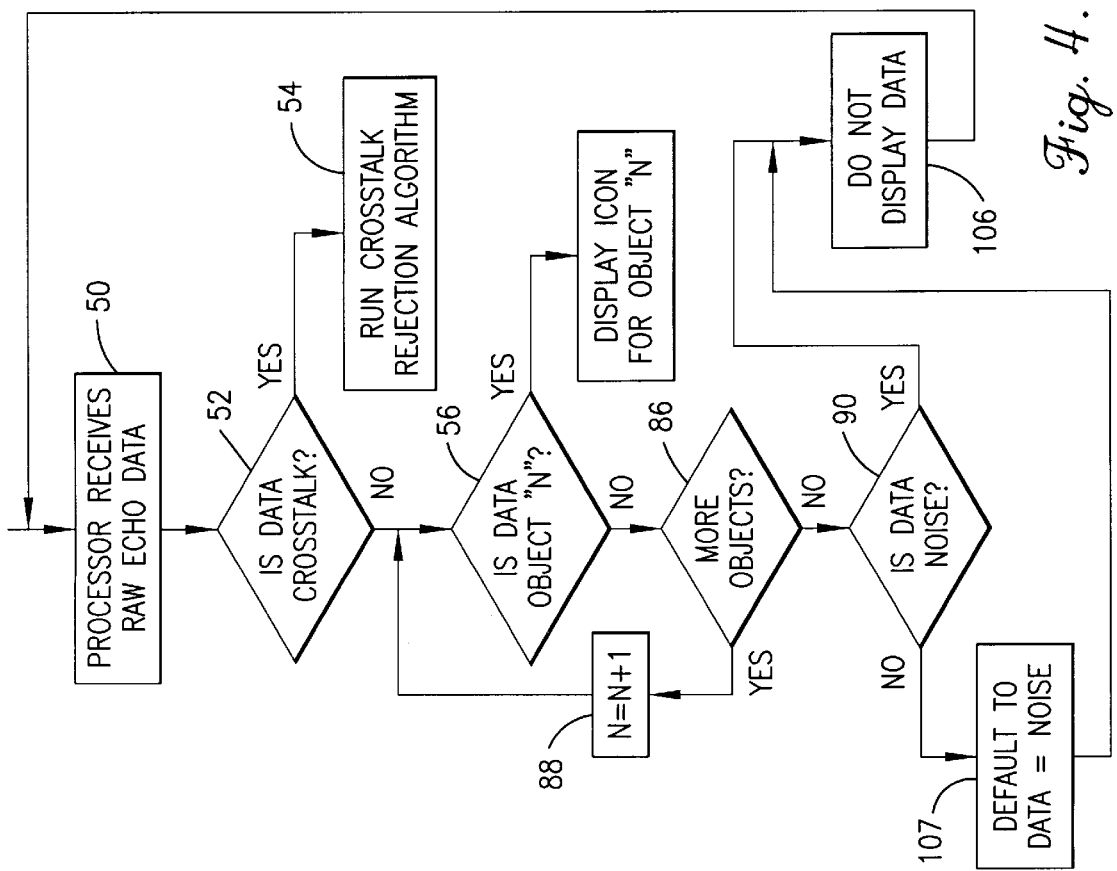
FIG. 4 is a main processing routine of the present invention.

With reference to FIG. 4, a main processing routine of the present invention is illustrated and described.

As indicated at reference numeral 50, processor 22 receives raw echo data that is reflected off of the bottom surface 20 of the body of water, and any objects located within the cone of detection defined by the generated sonar pulses 36. As indicated at step 52, processor 22 determines whether the received echo data is indicative of cross-talk. As will be understood by those skilled in the use and operation of sonar depth sounders, cross-talk noise often results from the presence of other sonar depth sounders in the general vicinity. As illustrated, when processor 22 determines that the received echo data is indicative of cross-talk, processing advances to step 54, and processor 22 runs a cross-talk rejection algorithm. Algorithms for rejecting cross-talk noise are known, and any conventional cross-talk algorithm may be utilized in accordance with the principles of the present invention.

Figure 5:
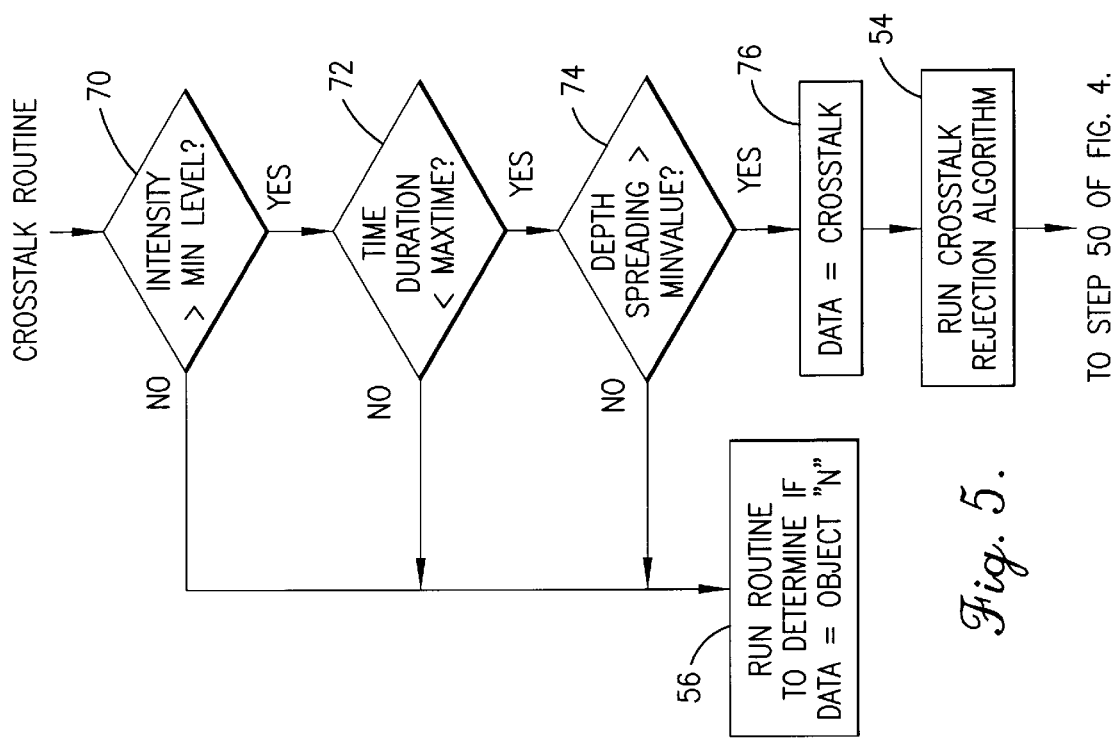
FIG. 5 is a subroutine for determining when received echo data is indicative of cross-talk.

Processor 22 determines, at step 52, whether the raw echo data is indicative of cross-talk by processing the data according to the steps of the cross-talk routine illustrated in FIG. 5. Particularly, the raw echo data received by the receiver has an intensity. Additionally, the received raw echo data has an associated time duration. In this regard, processor 22 monitors the amount of time raw echo data, associated with a particular object, is received. For example, as each sonar pulse is emitted into the body of water, and reflected off of a particular object, a corresponding echo pulse is received by the receiver. As described, the time from the first received pulse corresponding to a particular object to the last received pulse corresponding to a particular potential object defines a time duration. In terms of raw echo data as exhibited in FIG. 3, a time duration associated with an object or potential object is measured in the horizontal direction. Thus, as stated, a typical fish object has a longer time duration than a typical cross-talk object. Additionally, the raw echo data received by the receiver also has an associated depth spreading value. The depth spreading value associated with the received raw echo data is measured, in the raw echo data as represented in FIG. 3, in the vertical direction. Thus, a typical fish object normally has smaller depth spreading value than that which would be displayed as typical cross-talk.

Figure 6:
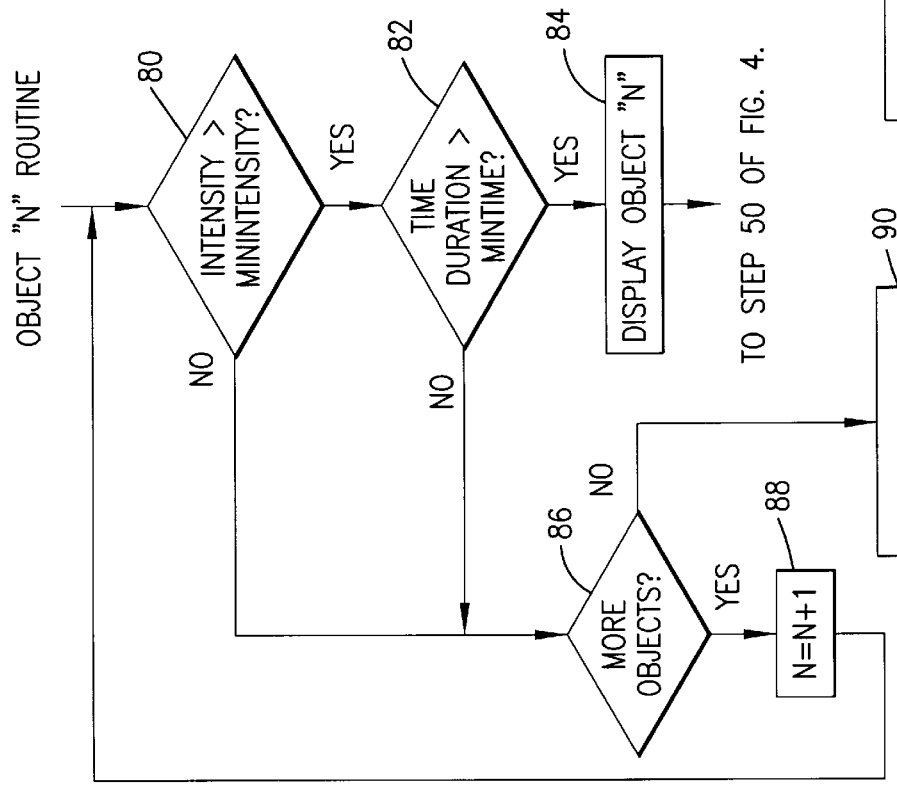
FIG. 6 is a subroutine for determining when received echo data is indicative of a selected object.

In accordance with the principles of the present invention, a minimum intensity level, designated by "MIN LEVEL" at step 70 of FIG. 5, is stored in memory 24 of sonar depth sounder 10. The actual MIN LEVEL value stored is based upon testing of the intensity signals that are typically associated with cross-talk. In accordance with the cross-talk routine of FIG. 5, at step 70, processor 22 determines whether the intensity of the raw echo data received by the receiver is greater than the MIN LEVEL value stored in memory 22. When it is determined at step 70 that the intensity of the received raw echo data is greater than the stored MIN LEVEL value, processing advances to step 72, where processor 22 determines whether the time duration associated with the raw echo data is less than a selected value. Particularly, a maximum time value typically associated with cross-talk, and determined by testing, is stored in memory 24 and is referred to as "MAXTIME". When processor 22 determines at step 72 that the time duration associated with the received raw echo data is less than the "MAXTIME" value stored in memory 24, processing advances to step 74, where processor 22 determines whether a depth spreading value associated with the received raw echo data is greater than a stored "MINVALUE". As will now be understood, a selected minimum value typically representing a minimum depth spreading value for cross-talk is stored in memory, and processor 22 compares the depth spreading value associated with the received raw echo data with the stored value. When it is determined at step 74 that the depth spreading value associated with the received raw echo value is greater than the stored MINVALUE, processor 22 concludes that the received raw echo data is indicative of cross-talk, as indicated at step 76, and the cross-talk rejection algorithm, identified at step 54 in both FIGS. 4 and 5, is run. When, however, processor 22 determines that at step 70, 72, or 74 that the "YES" condition is not met, processing advances to step 78 to run the routine, as set forth in FIG. 6, to determine whether the received raw echo data is indicative of an object "N".

Accordingly, with reference again to FIG. 4, processor 22 determines at step 52 whether the received echo data is indicative of cross-talk by carrying out one or more of the steps 70, 72, and 74 of FIG. 5.

At step 56 of the main routine illustrated in FIG. 4, processor 22 determines whether the received raw echo data is indicative of an object "N". With additional reference to FIG. 6, processor 22 determines, at step 56 of FIG. 4, whether the received raw echo data is indicative of a selected object "N" by running the object "N" routine illustrated in FIG. 6. Particularly, as indicated at step 80 of FIG. 6, processor 22 determines whether the intensity of the received raw echo data is greater than an intensity value defined as "MININTENSITY". In this regard, a selected value representative of a minimum intensity associated with the particular object "N", is stored in memory and referred to as "MININTENSITY". For example, assume that the selected object "N" is a fish. Through testing, it can be determined that the intensity of raw echo data that is reflected off of a fish is typically greater than a minimum value. Data indicative of the minimum value is stored in memory 24 as "MININTENSITY".

When it is determined at step 80 by processor 22 that the intensity of the received raw echo data is greater than the stored MNNTENSITY value, processing advances to step 22, where processor 22 determines whether a time duration associated with the received raw echo data is greater than a minimum time value, referred to as "MINTIME", for the selected object "N". When processor 22 determines at step 82 that the time duration associated with the received raw echo data is greater than the stored "MINTIME" value, processor 22 concludes that the raw echo value data is indicative of the selected object "N", and processor 22 displays an icon representative of the object "N" on the display 28, as illustrated at step 84 of FIG. 6. When, however, processor 22 determines at step 80 of FIG. 6 that the intensity of the received raw echo data is not greater than the stored "MININTENSITY" value, or when processor 22 determines at step 82 that the time duration associated with the received raw echo data is not greater than the stored MINTIME value, processing advances to step 86 to determine whether there are any additional objects to be considered. In other words, stored in memory 24 are the various parameters associated with each object and, when processor 22 determines at step 86 that an additional object has been parameterized, the processor advances N to N+1, as indicated at step 88, and processing returns to step 80 to determine the received raw echo data is indicative of the object N=N+1. When processor 22 determines that the received raw echo data is not indicative of the particular object N, and there are no additional objects to consider, as determined at step 86, processing advances to step 90 to determine whether the received raw echo data is indicative of unidentifiable noise.

Figure 7:
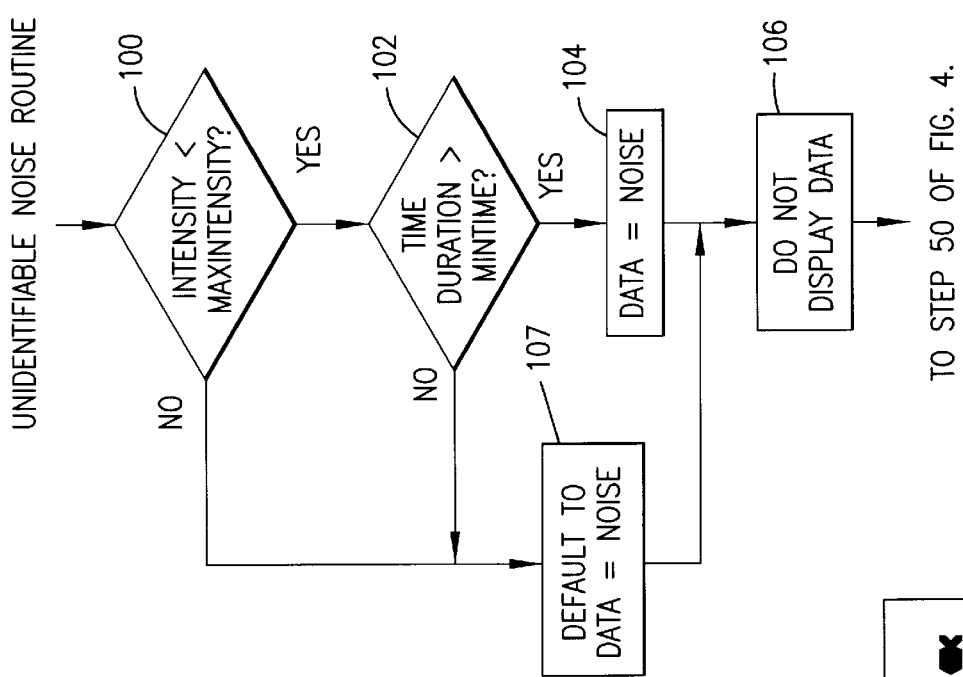
FIG. 7 is a subroutine for determining when received echo data is indicative of unidentifiable noise.

More particularly, processor 22 determines at step 90 (of FIG. 4) whether the received raw echo data is indicative of unidentifiable noise by processing the steps illustrated in FIG. 7. Particularly, at step 100 in FIG. 7, processor 22 determines whether the intensity of the received raw echo data is less than a selected maximum intensity value associated with unidentifiable noise, and referred to as "MAXINTENSITY". As will by now be understood, a selected maximum intensity value associated with unidentifiable noise is stored in memory 24, and is selected based upon prior testing. When it is determined at step 100 that the intensity of the received raw echo data is less than the stored "MAXINTENSITY" value, processing advances to step 102, and processor 22 determines whether the time duration associated with the received raw echo data is greater than a selected minimum time value stored in memory 22, and referred to as "MINTIME". When it is determined at step 102 by processor 22 that the time duration associated with received raw echo data is greater than the "MINTIME" value, processor 22 concludes that the received raw echo data is indicative of unidentifiable noise, as represented at step 104, and the processor 22 does not display the data representative of the noise, as indicated at step 106. It will be understood and appreciated that the device of the present invention can be programmed so that all data is initially displayed, as received, on display 28, and then removed from the display once it is determined that it is indicative of something, such as noise, for which display is undesirable. When processor 22 determines at step 100 that the intensity of the received raw echo data is not less than the selected "MAXINTENSITY" value, or processor 22 determines at step 102 that the time duration associated with the received raw echo data is not greater than the stored "MINTIME" value, the processor 22 also then considers the raw echo data to be unidentifiable noise, as indicated at step 107. The processor 22 does not display data, on the display 28, indicative of the raw echo data. Processor 22 then awaits receipt of additional raw echo data, and processing returns to step 50 of FIG. 4. As described, processing data according to the routine of FIG. 7 always results in a determination that the raw echo data is indicative of unidentifiable noise. It will be understood that the routine of FIG. 7 could thus be avoided altogether. However, processing the routine of FIG. 7 allows the processor 22 to identify when the raw echo data is within, or not within, the parameters selected for unidentifiable noise. This identification can be utilized to redefine the selected parameters and/or to assist in identification of the character of the unidentifiable noise object. It should be understood that a default setting, other than unidentifiable noise, can be selected.

Figure 8:
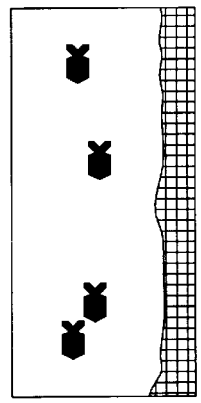
FIG. 8 is an illustration of a display, displaying icons of fish in accordance with the principles of the present invention.

Accordingly, the present invention utilizes a number of characteristics of received raw echo data, namely, the intensity of the raw echo data, the time duration associated with the raw echo data (as represented horizontally), and the depth spreading associated with the received raw echo data (as represented vertically), and determines whether those characteristics of received raw echo data fall within selected parameters, for the purpose of identifying that which the received raw echo data most likely represents. Then, based upon that information, the display 28 is controlled to display icons indicative of the particular objects, such as fish, and to not display cross-talk noise or other, unidentifiable noise. Accordingly, the sonar depth sounder of the present invention, upon receipt of the data represented in FIG. 3, generates a display on display 28 as illustrated in FIG. 8.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A sonar depth sounder device comprising:

a transmitter for generating a plurality of sonar signals towards the bottom surface of a body of water;

a receiver for receiving reflected sonar signals which have reflected back from the bottom surface of the body of water and from an object suspended between a top surface of the body of water and the bottom surface of said body of water, wherein said reflected signals reflected from said suspended object have an intensity and define a time duration associated with said suspended object, and further define a depth spreading characteristic associated with said suspended object;

a memory for storing a first set of data parameters indicative of a selected object and a second set of data parameters indicative of noise;

a processor, connected to said memory and said receiver, for processing said reflected signals; and a display, connected to said processor, wherein said processor, based upon at least one of said intensity, said time duration and said depth spreading characteristics, causes said display to display data indicative of said selected object when said reflected data is within said data parameters defining said selected object.

2. The sonar depth sounder device as set forth in claim 1, wherein said data parameters indicative of noise are indicative of cross-talk noise and said processor processes steps to reject said reflected signals when said reflected signals represent data within said data parameters defining cross-talk noise.

3. The sonar depth sounder device as set forth in claim 1, wherein said time duration associated with said suspended object defines a characteristic of said suspended object in a horizontal direction.

4. A sonar depth sounder device as set forth in claim 1, wherein said depth spreading characteristic associated with said suspended object defines a characteristic of said suspended object in a vertical direction.

5. A sonar depth sounder device comprising:
a transmitter for generating a plurality of sonar signals towards the bottom surface of a body of water;
a receiver for receiving reflected sonar signals which have reflected back from an object suspended between a top surface of the body of water and the bottom surface of said body of water, wherein said reflected signals have an intensity and define a time duration associated with said suspended object, and further define a depth spreading characteristic associated with said suspended object;
a memory for storing a first set of data parameters indicative of a selected object, a second set of data parameters indicative of cross-talk noise, and a third set of data parameters indicative of unidentifiable noise;
a processor, connected to said memory and said receiver, for processing said reflected signals, wherein said processor determines whether said received data is indicative of said cross-talk noise, said selected object, or said unidentifiable noise, and,
when said received signals are indicative of cross-talk noise, said processor processes steps to eliminate said cross-talk noise, and when said received signals are indicative of a selected object, said processor causes said display to display data indicative of the selected object, and when said received signals are indicative of unidentifiable noise, said processor does not display data representative thereof on said display.

6. A method for identifying the nature of echo data received by a sonar depth sounder having a display, said method comprising:
determining whether said received echo data is indicative of cross-talk noise, and when said echo data is indicative of cross-talk noise, rejecting said echo data;
determining whether said echo data is indicative of a selected object and, when said echo data is indicative of a selected object displaying data indicative of said selected object on said display; and
determining whether said echo data is indicative of unidentifiable noise, and when said echo data is indicative of unidentifiable noise, not displaying said echo data on said display.

7. The method as set forth in claim 6, wherein said echo data has an intensity and comprises data indicative of a time duration and a depth spreading value, said step determining whether said echo data is indicative of cross-talk noise comprising:
comparing at least one of said intensity, said time duration, said depth spreading value with a corresponding selected value.

8. The method as set forth in claim 6, said step of determining whether said echo data is indicative of cross-talk noise further comprising:
determining whether said intensity of said echo data is greater than a selected minimum intensity threshold value and, when said intensity is not greater than said selected minimum intensity threshold value, concluding that said received echo data is not indicative of cross-talk noise.

9. The method as set forth in claim 6, said step of determining whether said received echo data is indicative of cross-talk noise further comprising:
determining whether said time duration associated with said echo data is less than a selected maximum time duration, and when said time duration of said received echo data is not less than said selected maximum time duration, concluding that said echo data is not indicative of cross-talk noise.

10. The method as set forth in claim 6, said step of determining whether said echo data is indicative of cross-talk noise further comprising:
determining whether said depth spreading value associated with said received echo data is greater than a selected minimum depth spreading value and, when said depth spreading value is not greater than said selected maximum depth spreading value, concluding that said echo data is not indicative of cross-talk noise.

11. The method as set forth in claim 6, wherein said step of determining whether said received echo data is indicative of cross-talk noise further comprises:
determining whether said intensity of said echo data is greater than a selected minimum intensity threshold value;
also determining whether said time duration associated with said echo data is less than a selected maximum time duration;
also determining whether said depth spreading value associated with said echo data is greater than a selected minimum depth spreading value; and,
when said intensity of the received echo data is greater than said selected minimum intensity threshold value, and said time duration is less than said selected maximum time duration, and said depth spreading value is greater than said selected minimum depth spreading value, then concluding that said echo data is indicative of cross-talk noise.

12. The method as set forth in claim 6, wherein the step of determining whether said echo data is indicative of selected object comprises:
determining whether said intensity of said echo data is greater than a selected minimum intensity threshold value, and when said intensity of said received echo data is not greater than said minimum intensity threshold value, concluding that said echo data is not indicative of said selected object.

13. The method as set forth in claim 6, wherein said step of determining whether said echo data is indicative of a selected object further comprises:
determining whether said time duration associated with said received echo data is greater than a selected minimum time duration value, and when said time duration associated with said received echo data is not greater than said selected minimum time duration value, concluding that said echo data is not indicative of said selected object.

14. The method as set forth in claim 6, wherein said step of determining whether said echo data is indicative of a selected object further comprises:
determining whether said intensity of said echo data is greater than a selected minimum intensity threshold value; and determining whether said time duration associated with said received echo data is greater than a selected minimum time duration value and, when said intensity of said received echo data is greater than said selected minimum intensity threshold value, and said time duration associated with said received echo data is greater than said selected minimum time duration, then concluding that said echo data is indicative of said selected object and displaying data indicative of said selected object on the display.

15. The method as set forth in claim 6, wherein said step of determining whether said echo data is indicative of unidentifiable noise comprises:

determining whether said intensity of said received echo data is less than a selected maximum intensity threshold value and, when said intensity is not less than said selected maximum intensity threshold value, then concluding that said echo data is not unidentifiable noise.

16. The method as set forth in claim 6, wherein said step of determining whether said echo data is indicative of unidentifiable noise comprises:

determining whether said time duration associated with said echo data is greater than a selected minimum time duration and when said time duration associated with said received echo data is not greater than said selected minimum time duration, then concluding that said echo data is not indicative of unidentifiable noise.

17. The method as set forth in claim 6, wherein said step of determining whether said echo data is indicative of unidentifiable noise comprises:

determining whether said intensity of said received echo data is less than a selected maximum intensity threshold value; and also determining whether said time duration associated with said received echo data is greater than a selected minimum time duration and, when said intensity of said received echo data is less than said selected maximum intensity threshold value and said time duration associated with said received echo data is greater than said selected minimum time duration value, then concluding that said echo data is indicative of unidentifiable noise.

* * * * *